(12) United States Patent
Dor et al.

(10) Patent No.: US 10,275,702 B2
(45) Date of Patent: Apr. 30, 2019

(54) TAILORING IDENTIFICATION TAGS TO ENHANCE SUITABILITY TO ORGANIZATION ASSETS

(71) Applicant: HALDOR ADVANCED TECHNOLOGIES LTD, Hod HaSharon (IL)

(72) Inventors: Guy Dor, Rosh Haayn (IL); Dan Zeeli, North York (CA); Ilan Kadosh-Tamari, Ramat Hasharon (IL)

(73) Assignee: ALDOR ADVANCED TECHNOLOGIES LTD, Hod HaSharon (IL)

( * ) Notice: Subject to any disclaimer, the term of this patent is extended or adjusted under 35 U.S.C. 154(b) by 0 days.

(21) Appl. No.: 15/746,418

(22) PCT Filed: Jul. 30, 2015

(86) PCT No.: PCT/IL2015/050787
§ 371 (c)(1),
(2) Date: Jan. 21, 2018

(87) PCT Pub. No.: WO2017/017666
PCT Pub. Date: Feb. 2, 2017

(65) Prior Publication Data
US 2018/0204103 A1 Jul. 19, 2018

(51) Int. Cl.
*G06K 19/00* (2006.01)
*G06K 19/077* (2006.01)
*H04B 5/00* (2006.01)

(52) U.S. Cl.
CPC ... *G06K 19/0776* (2013.01); *G06K 19/07773* (2013.01); *H04B 5/0062* (2013.01)

(58) Field of Classification Search
USPC .......... 235/435, 439, 454, 487, 492; 340/10, 340/572
See application file for complete search history.

(56) References Cited

U.S. PATENT DOCUMENTS

| | | | |
|---|---|---|---|
| 2008/0018479 A1* | 1/2008 | Hashimoto | G06K 19/07749 340/572.8 |
| 2008/0231421 A1 | 9/2008 | Tuttle | |
| 2009/0102663 A1* | 4/2009 | Hillegass | G06K 7/0008 340/572.5 |
| 2010/0102969 A1* | 4/2010 | Svalesen | G06K 17/0022 340/572.8 |
| 2013/0133800 A1* | 5/2013 | Griffoin | B60C 23/0493 152/450 |

FOREIGN PATENT DOCUMENTS

KR  20120017560 A  2/2012

* cited by examiner

*Primary Examiner* — Matthew Mikels
(74) *Attorney, Agent, or Firm* — Soroker Agmon Nordman

(57) ABSTRACT

A method of preparing an enhanced tag with an antenna for attaching to metallic assets at a client, including, forming a count of the number of metallic assets of each type that will use the tag at the client, determining an optimal antenna frequency setting for the antenna for each type of metallic asset, calculating an enhanced antenna frequency setting for the enhanced tag to provide enhanced communication with the tag when used with the clients assets based on the count and the determining.

17 Claims, 3 Drawing Sheets

TAILORING IDENTIFICATION TAGS TO ENHANCE SUITABILITY TO ORGANIZATION ASSETS

TECHNICAL FIELD

The present invention relates to the attachment of identification tags to assets in an organization and more specifically to attaching to assets having a variety of metallic surfaces.

BACKGROUND

In many environments multiple tools and disposables are used, including for example operation rooms, aircraft hangars, garages, and the like.

The central sterile services department (CSSD), also called sterile processing department (SPD), sterile processing, central supply department (CSD), or central supply, is an integrated place in hospitals and other health care facilities that perform cleaning, decontamination, sterilization and other reprocessing processes on medical devices, surgical items, equipment and consumables. These processes are required for subsequent use of the medical devices by health workers in the operating theatre of the hospital and also for other aseptic procedures, e.g. catheterization, wound stitching and bandaging in a medical, surgical, maternity or pediatric ward.

An operation room and/or operation theatre are facilities in which intrusive operations are performed on patients. CSSD, SPD, CSD, operating room, operating theatre are all considered to be part of an healthcare facility (i.e. Hospital) perioperative environment (the "Perioperative Environment"). Typically, multiple people participate in Perioperative Environment related procedures. For example participants during an operation can include all or some of the following: a chief surgeon, sometimes an assistant surgeon, an anesthesiologist, a scrub nurse, and a circulating nurse. Within the CSSD, SPD, CSD and the related workflows that are being conducted, participants can include all or some of the following: Sterile processing and distribution technician (SPD tech or CPD tech), Central sterile supply technician (CSS tech), Central processing technician (CPT), Central service technician (CST), Biomedical Engineer (BE) and other participants as needed. In the Perioperative Environment the participating personnel members use multiple surgical items, such as scalpels, forceps, and others, varying according to the workflow, reprocessing process, surgeries that are being performed and/or surgeries that are being prepared for by the participating personnel.

Intensive efforts are invested in keeping track of all surgical items and disposables, in order to make sure that no item unintentionally remains inside the patient's body, no surgical item is incorrectly packed and/or incorrectly reprocessed prior to additional usage. Therefore careful monitoring of workflows and processes relating to all surgical items are performed in the Perioperative Environment, including counting of all surgical items before, during and after an operation.

Counting the surgical items is a tedious job and requires intensive resources, including mental resources, personnel time and down-time of the operating room. Counting the surgical items towards the end of an operation also increases the time the patient's body is open with the associated risks.

In addition, counting is not always error-free, and in many cases surgical items end up being left within the patient's body, causing severe damage and even death.

Another problem relates to the life cycle of the surgical items. For example, reusable surgical items used in an operation need to be sanitized and/or sterilized prior to further usage. Other constraints may relate to maintenance operations required for the surgical items, for example, a blade may have to be sharpened after a predetermined number of operations in which it is used. In another example, surgical items that have been used in an operation performed on a patient with a contagious disease may require extra sterilization before further usage. Making sure that each surgical item is used and maintained properly also imposes expenses and requires resources, including record keeping and tracking, manual labor and the like.

In U.S. Pat. No. 8,193,938 to Halberthal et al dated Jun. 5, 2012 there is disclosed a computerized system and method for keeping track of tools, wherein each tool is uniquely identified. Identifying the tools is performed using a Radio Frequency (RF) identification transducer tag that is attached to the tools. The use of a computerized system improves the ability to track the tools and reduce system overhead. Generally, the tags are designed as passive RFID tags that function in the HF range (e.g. 13.56 MHz) or UHF range (e.g. 860-960 MHz).

In many cases organization use cases, boxes, sets and/or containers (referred to herein as assets) for storing and transporting groups of tools and disposable items. The assets may include metallic and non-metallic containers and trays. In the computerized system it is desirable to also keep track of the assets that are used by the organization in dealing with the tools and disposable items.

In contrast to tools and disposables, in the case of assets the tags are attached with direct contact between the asset and the tag. In the case of metallic assets the transmission signals received and returned by the tags are influenced by the metal of the asset. The various assets may be made from different types of metals, and have different sizes, shapes and thickness. Some of the assets may be solid metal containers and some may be mesh containers or combinations thereof.

Tags attached to metallic containers suffer from a performance degradation due to the induced currents in the antenna of the tag being cancelled by opposite currents induced in the metallic containers. The degradation level is directly affected by the type of metal, density and geometry of the asset. This causes a shift in the operating frequency of the tag leading to impedance mismatch, distorted radiation patterns and reduced gain. By adjusting the antenna used in the RFID tag the shift can be counteracted for a specific type of container so that the shift will not interfere with the performance of the tag as viewed by a tag reader. However if more than one type of asset is used then the organization would need multiple types of tags for use with each type of asset. It should be noted that assets that are visually the same in the eyes of a user may also differ in their influence on the tag due to various differences, such as the materials used, thickness and density of the metal.

SUMMARY

An aspect of an embodiment of the disclosure relates to a method of preparing an enhanced identification tag for attaching to metallic assets of a client. The enhanced identification tag is formed by forming a count of the number of metallic assets that are used by the client for each type of asset, for example the number of solid steel containers of a specific size and the number of metallic mesh baskets of a specific size. Determining an optimal antenna frequency setting for the tag antenna if it were attached to each type of the metallic asset. Then calculating an enhanced antenna frequency setting that takes into account the count of each type of asset and the determined optimal frequency for each type of asset.

In an exemplary embodiment of the disclosure, the enhanced antenna frequency is the average optimal frequency that is calculated from the counts and the optimal frequency settings. Alternatively, it can be the average optimal frequency, assuming that a similar number of units are used for all the different assets. In some embodiments of the disclosure only the optimal frequency settings from the most common assets are used. Optionally, assets that have a low count will be ignored.

There is thus provided according to an exemplary embodiment of the disclosure, a method of preparing an enhanced tag with an antenna for attaching to metallic assets at a client location, comprising:
Forming a count of the number of metallic assets of each type that will use the enhanced tag at the client location;
Determining an optimal antenna frequency setting for the antenna for each type of metallic asset;
Calculating an enhanced antenna frequency setting for the enhanced tag to provide enhanced communication with the tag when used with the clients assets based on the count and the determining.

In an exemplary embodiment of the disclosure, the enhanced antenna frequency setting is the average optimal frequency. Optionally, the count for asset types having less than a pre-determined percent of the average number of assets per type are ignored. In an exemplary embodiment of the disclosure, the count is assumed to be equal for all asset types. Optionally, the preparing is performed for an entire hospital. Alternatively, the preparing is performed independently for different wards of a hospital. In an exemplary embodiment of the disclosure, the enhanced tag is marked with a unique color to prevent mixing it with a tag having a different antenna setting. Optionally, the enhanced tag is marked with an indication of the antenna setting. In an exemplary embodiment of the disclosure, the tags are attached to the assets adhesively. Optionally, the tags are plasma or corona treated to enhance adhesion. Alternatively or additionally, the tags are attached to the assets mechanically.

There is further provided according to an exemplary embodiment of the disclosure, an enhanced tag for attaching to metallic assets at a client location, comprising:
An identification circuit that provides identification information;
An enhanced antenna connected to the identification circuit that is adjusted to enhance communication with the identification circuit by:
a. forming a count of the number of metallic assets of each type that will use the tag at the client;
b. determining an optimal antenna frequency setting for the antenna for each type of metallic asset;
c. calculating an enhanced antenna frequency setting for the enhanced tag to provide enhanced communication with the tag when used with the clients' assets based on the count and the determining of an optimal antenna frequency setting.

In an exemplary embodiment of the disclosure, the enhanced antenna frequency setting is the average optimal frequency. Optionally, the count for asset types having less than a pre-determined percent of the average number of assets per type are ignored. In an exemplary embodiment of the disclosure, the count is assumed to be equal for all asset types.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale and each elements or part may be larger or smaller relative to other elements.

DETAILED DESCRIPTION

Figure 1:
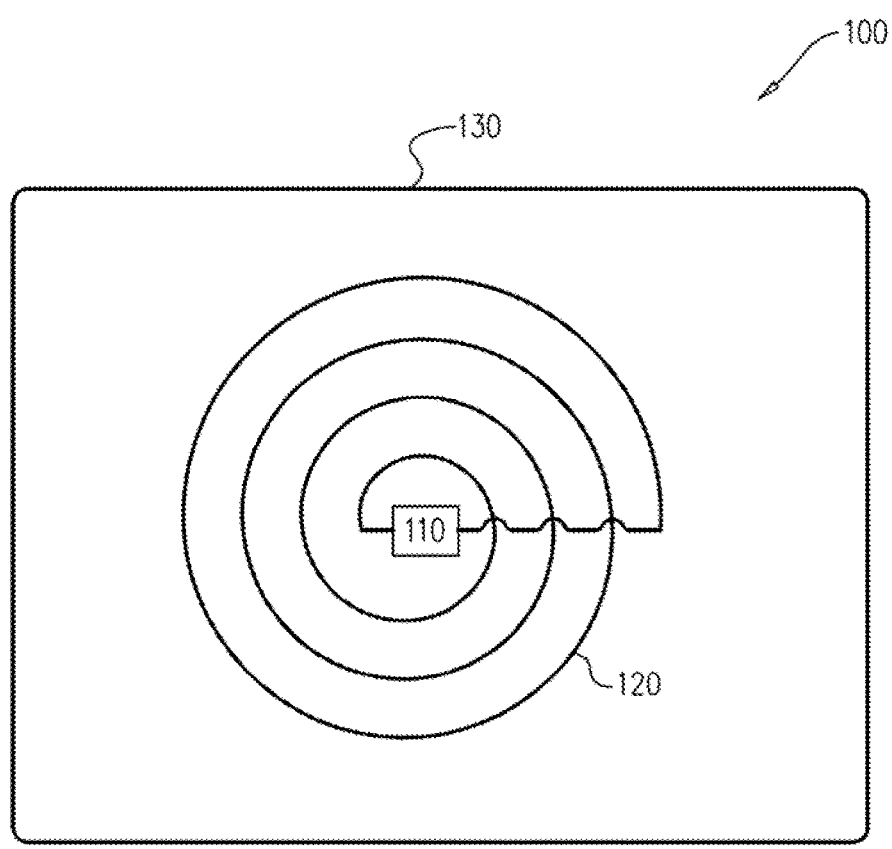
FIG. 1 is a schematic illustration of a tag having an antenna tuned for a specific frequency, according to an exemplary embodiment of the disclosure.

FIG. 1 is a schematic illustration of a tag 100 having an antenna 120 tuned for a specific frequency, according to an exemplary embodiment of the disclosure. In an exemplary embodiment of the disclosure, tag 100 includes an RFID circuit 110 coupled to antenna 120 and enclosed in an enclosure 130. Optionally, antenna 120 is designed based on the environment in which the tag 100 will be used, for example if the tag is to be attached to non-metallic assets, for example plastic containers or trays the antenna 120 will be designed to have optimal reception at a specific frequency provided by a transmitter attempting to read the tag 100, for example a specific HF frequency such as 13.56 MHz. However if the tag is to be coupled to a metallic assets, the frequency sensed by the antenna may be shifted, for example +1 MHz to 14.56 MHz due to the interference of the metal. Optionally, using an adjusted antenna (e.g. designed for 12.56 MHz which is 13.56 MHz-1 MHz) will provide better performance. The influence of each metallic asset on the tags differs based on the characteristics of the metallic asset. In an exemplary embodiment of the disclosure, for each client (e.g. organization) an adjusted antenna that is calculated for the client is used for the tags that are attached to all the metallic assets of the client.

Figure 2:
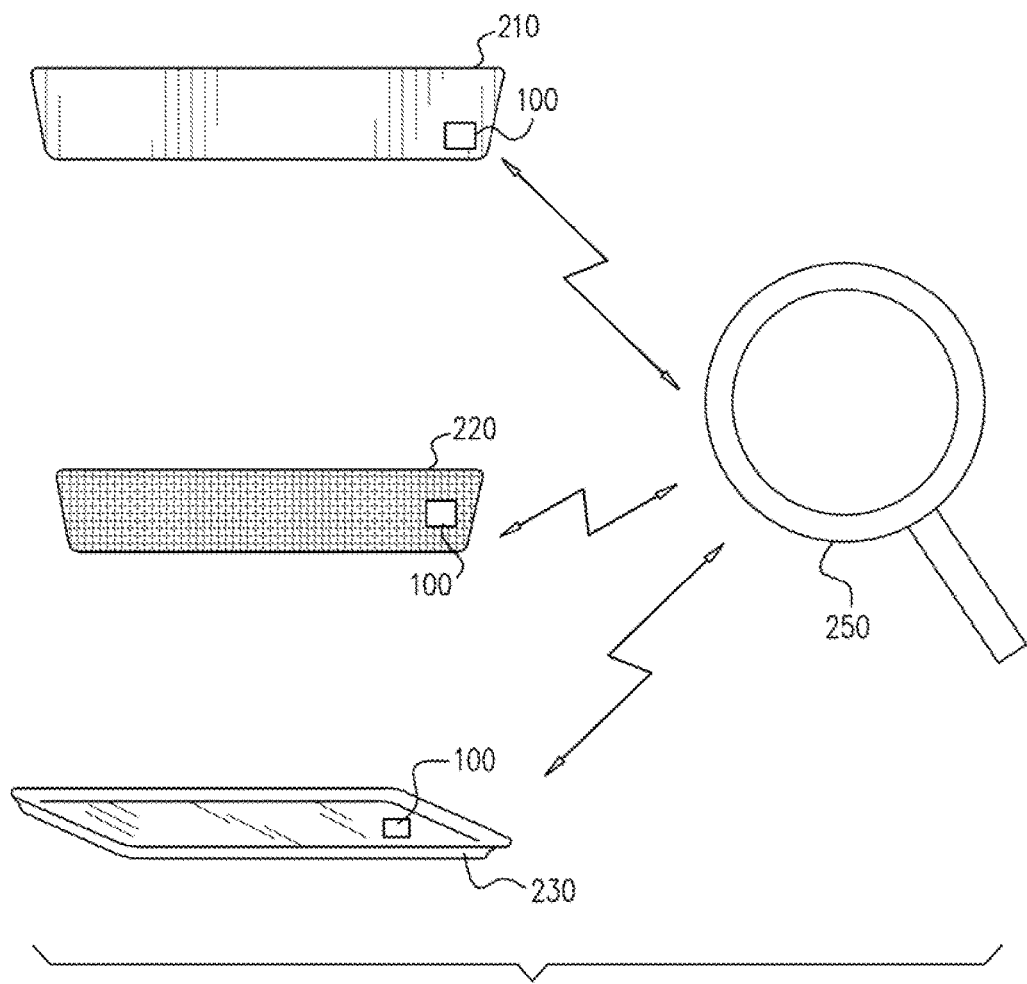
FIG. 2 is a schematic illustration of a plurality of assets with tags for tracking them with a tag reader, according to an exemplary embodiment of the disclosure.

FIG. 2 is a schematic illustration of a plurality of assets (210, 220, 230) with tags 100 for tracking them using a tag reader 250, according to an exemplary embodiment of the disclosure. In an exemplary embodiment of the disclosure, the client has multiple types of assets for handling tools and disposables, for example metal container 210, metal mesh basket 220, and metal flat tray 230. Optionally, the client has multiple units of each type, for example X units of asset 210, Y units of asset 220 and Z units of asset 230. For example a hospital may have a few hundred different types of assets and a few thousand units of each asset. Optionally, the influence caused by different types of assets may vary widely (e.g. 5-10 MHz) whereas the influence of different units of the same type of asset may vary (1 MHz or less) due to variations in the metal construction or placement of the tag.

Figure 3:
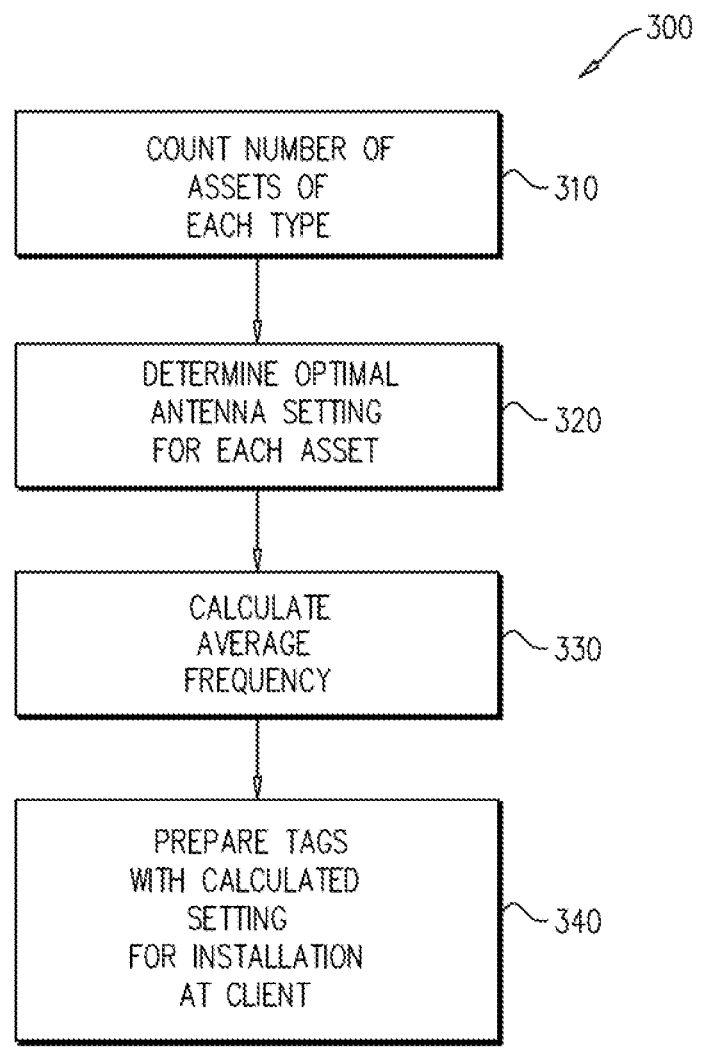
FIG. 3 is a flow diagram of a method of enhancing a tag for a client, according to an exemplary embodiment of the disclosure.

FIG. 3 is a flow diagram of a method 300 of enhancing a tag for a client according to an exemplary embodiment of the disclosure. In an exemplary embodiment of the disclosure, a technician performs a count (310) of the number of units of each type of the assets (210, 220, 230), for example 10000 units of asset 210, 5000 units of asset 220, and 7000 units of asset 230. Optionally, the count may be approximate, for example based on the number of units purchased, without physically counting the units in use, unless a large discrepancy is expected. In an exemplary embodiment of the disclosure, a technician measures the influence of each type of asset (210, 220, 230) on the frequency to determine (320) an optimal antenna setting for tags in use with that type of asset, for example for asset 210 it might be determined to shift the optimal reception/transmission frequency of the antenna 120 by +2 MHz, for asset 220 by +5 MHz and for asset 230 by +1 MHz. Once the count (310) for each unit is determined and the optimal setting for each unit is determined (320), an enhancement setting for the antenna 120 is calculated (330) to provide enhanced communications with the tag 100 when used with the clients assets (210, 220, 230).

In an exemplary embodiment of the disclosure, the calculation (330) determines the average antenna setting by multiplying the number of units for each setting with the optimal setting value, summating all the products and dividing by the total number of units. In some embodiments of the disclosure, units which have less than a pre-determined number or percent of the average number of units per asset will be ignored, for example less than 1-10% of the average number of units per asset type. Alternatively, the enhanced setting is determined as an average of the optimal antenna settings disregarding the number of units for each type of asset or for example by assuming that the count is equal for all asset types. Optionally, when the difference between the number of units is not great or the client intends to maintain an approximately equal number of units per asset type the latter method may be preferred.

Once the enhanced setting for antenna 120 is determined, the tags are prepared (340) with the calculated setting for installation at the client on all the metallic assets (210, 220, 230). The enhanced tag improves the performance in reading the tags installed on the assets (210, 220, 230) since it is directed to having an antenna 120 that is close to the optimal antenna setting for most of the assets (210, 220, 230).

In some embodiments of the disclosure, the client may be an entire hospital or a specific ward of a hospital. Alternatively, the client may be an airplane maintenance company or a single hanger. In some embodiments of the disclosure, each client will be marked by a different color tag to prevent mixing up the enhanced tags 100 of the client with tags of another client that are set to a different antenna setting. Likewise color coding can be used to differentiate between tags for tools and tags for disposable items although the tags may also differ physically.

Optionally, the tags are marked with an indication of the antenna setting so that a person can identify the antenna setting without using dedicated measuring equipment.

In some embodiments of the disclosure, the tag 100 is adhesively attached to the assets (210, 220, 230). Alternatively or additionally, the tag is attached using mechanical means, for example a clasp, a nut and bolt, staples or the like. Further alternatively, the tag may be embedded within the asset by the manufacturer.

In an exemplary embodiment of the disclosure, the attachment surface on the enclosure 130 is plasma or corona treated to enhance the connection between the tag and the asset to withstand treatment processes applied to the asset (e.g. washing and sterilization).

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of preparing an enhanced tag with an antenna for attaching to metallic assets at a client, composing:
    connecting the antenna to an identification circuit that uniquely identifies one of the metallic assets;
    forming a count of the number of metallic assets of each type that will use the enhanced tag at the client;
    determining an optimal antenna frequency setting for the antenna for each type of metallic asset;
    calculating an enhanced antenna frequency setting for the enhanced tag to provide enhanced communication with the tag when used with the clients assets based on the count and the determining;
    adjusting the antenna based on the calculated enhanced antenna frequency setting.

2. A method according to claim 1, wherein the enhanced antenna frequency setting is the average optimal frequency.

3. A method according to claim 1, wherein the count for asset types having less than, a pre-determined percent of the average number of assets per asset are ignored.

4. A method according to claim 1, wherein the count is assumed to be equal for all asset types.

5. A method according to clan 1, wherein the preparing is performed for an entire hospital.

6. A method according to claim 1, wherein the preparing is performed independently for different wards of a hospital.

7. A method according to claim 1, wherein the enhanced tag is marked with a unique color to prevent mixing it with a tag having a different antenna setting.

8. A method according to claim 1, wherein the enhanced tag is marked with an indication of the antenna setting.

9. A method according to claim 1, wherein the tags are attached to the assets adhesively.

10. A method according to claim 9, wherein the tags are Plasma treated to enhance adhesion.

11. A method according to claim 1, wherein the tags are attached to the assets mechanically.

12. A method according to claim 1, wherein the tags are embedded in the asset.

13. An enhanced tag for attaching to metallic assets at a client, comprising:
    an identification circuit that uniquely identifies one of the metallic assets;
    an antenna connected to the identification circuit that is configured to enhance communication with the identification circuit by:
    a. forming a count of the number of metallic assets of each type that will use the tag at the client;
    b. determining an optimal antenna frequency setting for the antenna for each type of metallic asset;
    c. calculating an enhanced antenna frequency setting for the enhanced tag to provide enhanced communication with the tag when used with the clients assets based on the count and the determining;
    d. adjusting the antenna based on the calculated enhanced antenna frequency setting.

14. An enhanced tag according to claim 13, wherein the enhanced antenna frequency setting is the average optimal frequency.

15. An enhanced tag according to claim 13, wherein the count for asset types having less than a pre-determined percent of the average number of assets per type are ignored.

16. An enhanced tag according to claim 13, wherein the count is assumed to be equal for all asset types.

17. An enhanced tag according to claim 13, wherein the tags are embedded in the asset.

\* \* \* \* \*